W. C. CARR.
CHANGE SPEED MECHANISM.
APPLICATION FILED JULY 30, 1920.
1,388,324.
Patented Aug. 23, 1921.
2 SHEETS—SHEET 1.
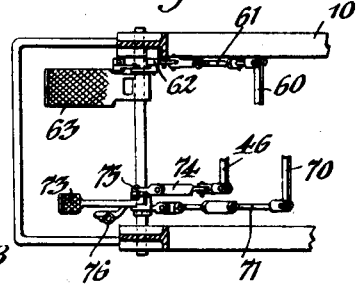
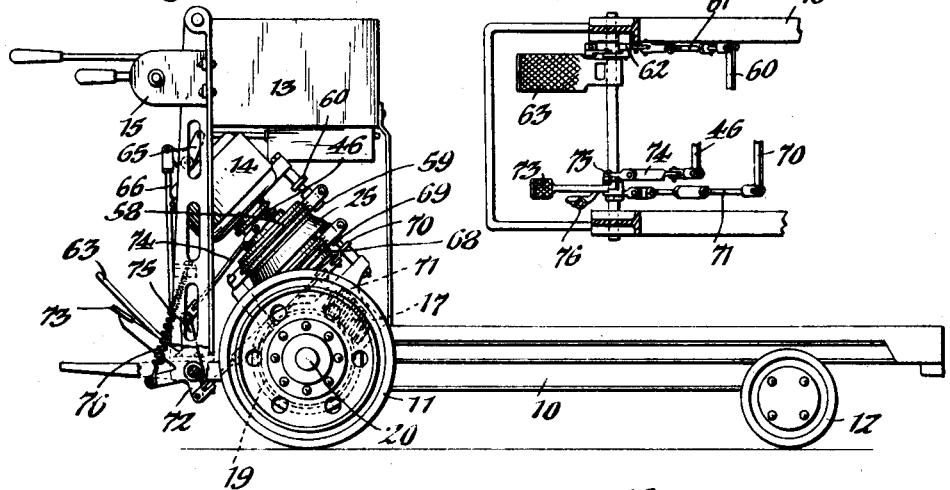
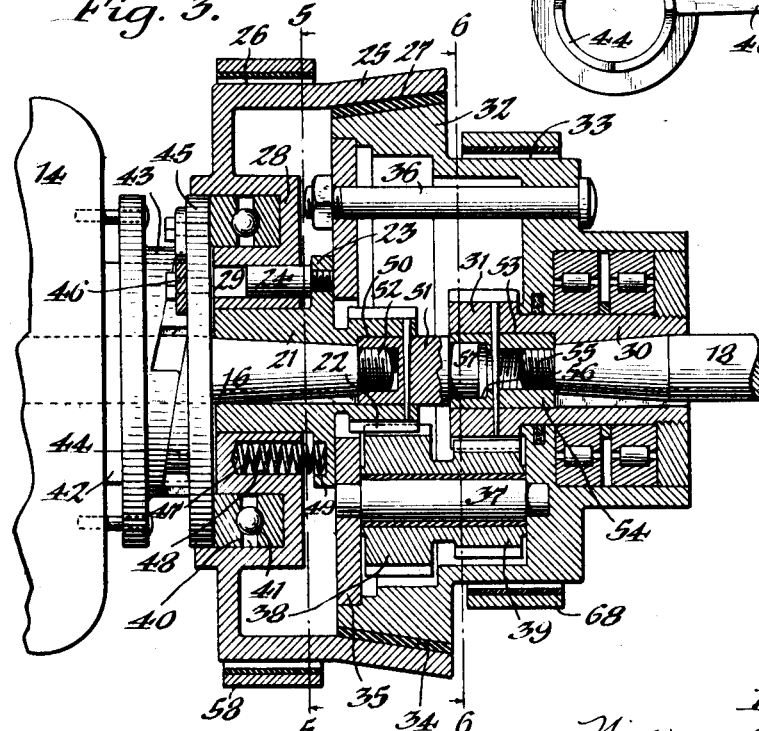
Inventor,
William C. Carr,
by Geyer & Popp
Attorneys.

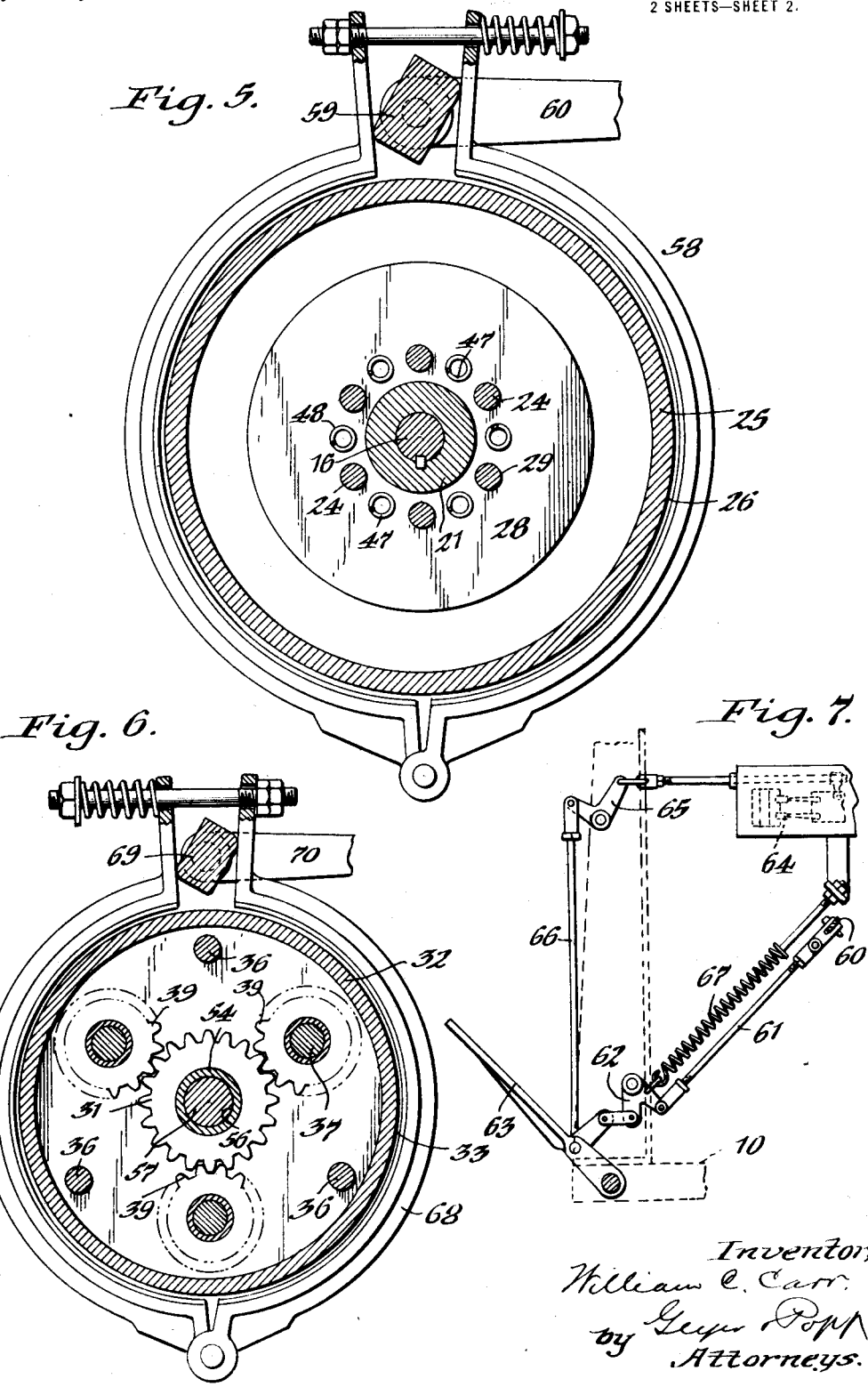

UNITED STATES PATENT OFFICE.

WILLIAM C. CARR, OF BUFFALO, NEW YORK.

CHANGE-SPEED MECHANISM.

1,388,324.  Specification of Letters Patent.  Patented Aug. 23, 1921.

Application filed July 30, 1920. Serial No. 400,133.

*To all whom it may concern:*

Be it known that I, WILLIAM C. CARR, a citizen of the United States, residing at Buffalo, in the county of Erie and State of New York, have invented new and useful Improvements in Change-Speed Mechanism, of which the following is a specification.

This invention relates more particularly to a change-speed mechanism of the clutch and planetary-gear type.

The principal objects of the invention are to provide a two-speed transmission of this character which is simple and compact in construction, which is efficient and reliable in operation, and which can be manufactured at a moderate cost.

Another object is to provide a mechanism of this character which permits of ease and quickness of control and which is particularly adaptable for motor driven trucks.

In the accompanying drawings:

Figure 1 is a sectional side elevation of a motor-truck embodying the improvement. Fig. 2 is a fragmentary top plan view thereof. Fig. 3 is a vertical longitudinal section, on an enlarged scale, of the change speed mechanism. Fig. 4 is a face view of the rotary cam ring and its actuating lever. Figs. 5 and 6 are vertical transverse sections on the correspondingly numbered lines in Fig. 3. Fig. 7 is an enlarged fragmentary side elevation of the motor control and main brake mechanism.

Similar characters of reference indicate corresponding parts throughout the several views.

For the purpose of illustration, my improvements are shown in connection with a motor driven truck comprising a main frame 10, driven wheels 11, steering wheels 12, a storage battery compartment 13, an electric motor 14, and a suitable controller 15 for the motor. The wheels 11 may be driven from the motor shaft 16 in any suitable manner, for instance, by means of a worm 17 secured to the propelling shaft 18 and meshing with a worm wheel 19 secured to the axle 20.

The change-speed transmission mechanism is interposed between the motor and the propelling shaft 18, and is preferably constructed as follows:

Keyed to the motor shaft 16 is a sleeve 21 which is held against longitudinal movement thereon and is provided at its inner end with a driving gear 22 which may be secured to or formed integral with said sleeve. In rear of its gear, the sleeve is provided with a flange 23 to which are secured rearwardly-extending driving pins 24. Mounted on the body of said sleeve and movable lengthwise thereof, is a female clutch member 25 having a peripheral brake surface 26 on its rear portion and an internal conical clutch surface 27 in its front portion. The hub 28 of this clutch member is provided with openings 29 with which the driving pins 24 engage at all times.

Keyed to the propelling or driven shaft 18 is a sleeve 30 which is held against longitudinal movement thereon and provided at its rear or inner end with a driven gear 31. Mounted on this sleeve and held against movement lengthwise thereof is a male clutch member 32 having a peripheral brake surface 33 on its front portion and an external conical surface 34 on its rear portion which coöperates with the female clutch member 25. 35 indicates a supporting plate secured to the rear end of the male clutch member 32 by bolts 36 or other appropriate means. Journaled at their ends in this supporting plate and the clutch member 32 are shafts 37 on each of which are mounted a pair of rigidly-connected planetary gears 38 and 39, the former meshing with the motor driven-gear 22 and the latter with the driven gear 31. The gears 22 and 31 and the planetary gears 38 and 39 are of the proper ratio to provide the desired speed.

Any suitable means may be employed for shifting the female clutch member into and out of engagement with the male clutch member, but the means shown in the drawings are preferable and constructed as follows:

The female clutch member is provided in its hub 28 with an outwardly-facing annular groove or socket 40 in which is arranged a thrust bearing 41. Secured to the motor frame and surrounding the inner collar 42 thereof is a stationary cam ring 43, while slidably mounted on said collar is a cam ring 44 which coöperates with the companion ring to shift the female clutch member into engagement with the male clutch member. The movable cam ring is provided with a flange 45 which is guided in the outer portion of the socket 40 and abuts constantly against the thrust bearing 41 through the medium of which the female clutch member is shifted. A suitable operating lever or handle 46 is fastened to the movable cam ring for turning it. The female clutch member is normally held in engagement with its companion male member by spring means connected with the operating lever 46, as hereinafter more fully described. To quickly and reliably separate the clutch members after turning the lever 46 backward for this purpose, coil springs 47 are interposed between the hub 28 of the female clutch member and the flange 23 of the sleeve 21, these springs being normally under compression and constantly tending to separate the clutch members. These springs are preferably housed in sockets 48 and 49 arranged in the hub 28 and the flange 23, respectively.

In order to properly aline the driving and driven shafts, the gear-end of the sleeve 21 is provided with an axial socket 50 in which is arranged a nut 51 screwed to the reduced portion 52 of the motor shaft and also pinned or otherwise secured to said sleeve. The opposing end of the sleeve 30 is provided with a similar socket 53 in which is arranged a nut 54 screwed to the reduced portion 55 of the driven shaft and also pinned or otherwise secured to said sleeve. The nut 54 is provided with a guide socket or pilot-opening 56 with which the pilot or opposing reduced end 57 of the nut 51 engages, thereby serving to properly aline the driving and driven shafts. This construction also permits of assembling the female clutch member and associated parts with the motor as a unit and then assembling this unitary structure with the male clutch member in an obvious manner.

A brake band 58 engages the brake surface 26 of the female clutch member and serves as the main brake for the truck. This brake band may be controlled in the usual manner, for instance, by a rocking cam block 59 actuated by a rock lever 60, to the free end of which is pivoted a link 61, operatively connected to a bell crank 62 actuated by a treadle 63. The latter also controls the customary motor switch 64, the movable element of which is connected with the treadle by a bell crank 65 and link 66. A spring 67 normally holds the treadle in its elevated or inoperative position, as shown in the drawings, in which position the brake is set and the motor switch open.

An auxiliary brake band 68 embraces the brake surface 33 of the male clutch member and is effective when it is desired to operate the truck at low speed. This brake band may be controlled by a rocking cam block 69 actuated by a rock lever 70 connected by a link 71 and an arm 72 with a treadle 73. This treadle also controls the movement of the female clutch member, and for this purpose the operating lever 46 of the movable cam ring 44 is connected therewith by a link 74 and an arm 75. A spring 76 serves to normally hold this treadle in its elevated or inoperative position, in which the brake band 68 is released from its clutch member and the cam ring holds the female clutch member in frictional engagement with its companion male member.

The operation of the mechanism is as follows:

When the truck is at rest, both of the treadles 63 and 73 are elevated, the motor switch 64 is open, the main brake 58 is applied, the clutch members are in engagement and the auxiliary brake 68 is released.

To start the truck and drive it at high speed, the operator depresses the treadle 63, thereby closing the motor circuit, releasing the main brake 58 and causing the propelling shaft 18 to be driven at the same speed as the motor or driving shaft 16 through the sleeve 21, pins 24, the clutch-members, planetary gears 38, 39 and driven gear 31. When it is desired to operate the truck at low speed, the auxiliary treadle 73 is depressed, and the main treadle 63 is at the same time held down. This movement of the treadle 73 permits the clutch members to be disengaged by the springs 47 and also applies the auxiliary brake 68, thereby arresting the further rotation of the male member of the clutch. Motion is now transmitted through the motor gear 22 and planetary gears 38 and 39 to the driven gear 31, thereby driving the propelling shaft 18 at a slower speed than that of the motor shaft.

It will be apparent from the foregoing that this improved clutch is not only simple in construction and efficient in operation, but also dispenses with the use of internal gears, reducing its cost and eliminating objectionable grinding and noise.

I claim as my invention:

1. The combination with a driving and a driven shaft, of a clutch member slidable relatively to said driving shaft but rotatable therewith, a second clutch member rotatable relatively to said driven shaft, a gear wheel rotatable with said driving shaft, a second gear wheel rotatable with said driven shaft, a planetary gear set carried by said second clutch member and meshing with said driving and driven gear wheels, means for normally holding said clutch members in engagement with each other, automatic means for releasing said clutch members when said holding means are moved to abnormal position, and means for holding said second clutch member against rotation when out of engagement with the companion clutch member.

2. The combination with a driving and a driven shaft, of a clutch member slidable relatively to said driving shaft but rotatable therewith, a second clutch member rotatable relatively to said driven shaft, a gear wheel rotatable with said driving shaft, a second gear wheel rotatable with said driven shaft, a planetary gear set mounted on said second clutch member and meshing with said driving and driven gear wheels, means for normally holding said clutch members in engagement, spring means interposed between said clutch members for releasing them when said clutch holding means is moved to its abnormal position, and means for holding said second clutch member against rotation when out of engagement with the companion clutch member.

3. The combination with a driving and a driven shaft, of a sleeve fixed on said driving shaft and having a flange, a clutch member slidable on said sleeve but rotatable therewith, a second clutch member rotatable relatively to said driven shaft, a gear wheel rotatable with said driving shaft, a second gear wheel rotatable with said driven shaft, a planetary gear set mounted on said second clutch member and meshing with said driving and driven gear wheels, means for normally holding said clutch members in engagement, releasing-springs interposed between the flange of said sleeve and said first-named clutch member, and means for holding said second clutch member against rotation when out of clutch engagement.

4. The combination with a driving and a driven shaft, of a sleeve fixed on said driving shaft and having a flange, a clutch member slidable on said sleeve, driving pins carried by the flange of said sleeve and engaging said clutch member, a second clutch member rotatable relatively to said driven shaft, a gear wheel rotatable with said driving shaft, a second gear wheel rotatable with said driven shaft, a planetary gear set mounted on said second clutch member and meshing with said driving and driven gear wheels, means for normally holding said clutch members in engagement, and means for holding said second clutch member against rotation when out of clutch engagement.

5. The combination with a driving and a driven member, of a clutch member having a hub and slidable relatively to said driving shaft but rotatable therewith, a second clutch member rotatable relatively to said driven shaft, a gear wheel rotatable with said driving shaft, a second gear wheel rotatable with said driven shaft, a planetary gear set mounted on said second clutch member and meshing with said driving and driven gear wheels, the hub of said first-named clutch member having an annular socket, a thrust bearing arranged in said socket, means engaging the outer face of said bearing for normally holding said clutch members in engagement, and means for holding said second clutch member against rotation when out of clutch engagement.

6. In a change speed mechanism of the character described, the combination of a driving shaft, a driven shaft in line therewith, sleeves secured to the opposing ends of said shafts, respectively, gear wheels mounted on said sleeves to turn therewith, coöperating clutch members carried by said shafts, planetary gears carried by one of said clutch members and meshing with said gear wheels, and shaft alining means comprising a nut secured to the inner end of said driven shaft and having a guide-socket, and a second nut secured to the opposing end of the driving shaft and having a part extending into said guide-socket.

WILLIAM C. CARR.